US012791732B2

(12) United States Patent
Wu et al.

(10) Patent No.: US 12,791,732 B2
(45) Date of Patent: Nov. 10, 2026

(54) SWIMMING ACTIVITY MONITORING

(71) Applicant: QUALCOMM Incorporated, San Diego, CA (US)

(72) Inventors: Jie Wu, San Diego, CA (US); Robert Dale Thrasher, Irvine, CA (US); Jeffrey Wong, Saratoga, CA (US); Krishnaranjan Rao, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 100 days.

(21) Appl. No.: 18/757,789

(22) Filed: Jun. 28, 2024

(65) Prior Publication Data

US 2024/0345257 A1 Oct. 17, 2024

Related U.S. Application Data

(63) Continuation of application No. 18/161,663, filed on Jan. 30, 2023, now Pat. No. 12,050,275, which is a (Continued)

(51) Int. Cl.
*G01S 19/19* (2010.01)
*G01S 19/34* (2010.01)
(Continued)

(52) U.S. Cl.
CPC .............. *G01S 19/19* (2013.01); *G01S 19/34* (2013.01); *G01S 19/42* (2013.01); *G01S 19/46* (2013.01); *G01S 19/47* (2013.01); *A63B 2244/20* (2013.01)

(58) Field of Classification Search
None
See application file for complete search history.

(56) References Cited

U.S. PATENT DOCUMENTS

| | | | |
|---|---|---|---|
| 5,907,281 | A | 5/1999 | Miller, Jr. et al. |
| 6,222,484 | B1 | 4/2001 | Seiple et al. |

(Continued)

FOREIGN PATENT DOCUMENTS

| | | | |
|---|---|---|---|
| CN | 104635598 | A | 5/2015 |
| CN | 105210420 | A | 12/2015 |

(Continued)

OTHER PUBLICATIONS

International Preliminary Report on Patentability—PCT/US2018/018344—The International Bureau of WIPO—Geneva, Switzerland—Nov. 21, 2019.

(Continued)

*Primary Examiner* — Bernarr E Gregory
(74) *Attorney, Agent, or Firm* — Procopio, Cory, Hargreaves & Savitch LLP

(57) ABSTRACT

A mobile device includes: a user input device; a satellite positioning system (SPS) receiver; a wireless communication signal transceiver; at least one motion sensor; and a processor communicatively coupled to the user input device and the SPS receiver, the processor being configured to: receive, from the user input device, a swimming indication of swimming by a user; and determine, in response to the swimming indication, a swimming stroke status based on one or more signals received by the SPS receiver.

15 Claims, 5 Drawing Sheets

Related U.S. Application Data continuation of application No. 16/752,310, filed on Jan. 24, 2020, now Pat. No. 11,609,339, which is a continuation of application No. 15/711,130, filed on Sep. 21, 2017, now Pat. No. 10,627,525.

(60) Provisional application No. 62/504,402, filed on May 10, 2017.

(51) Int. Cl.

| | |
|---|---|
| ***G01S 19/42*** | (2010.01) |
| ***G01S 19/46*** | (2010.01) |
| ***G01S 19/47*** | (2010.01) |

(56) References Cited

U.S. PATENT DOCUMENTS

| | | | | |
|---|---|---|---|---|
| 6,657,585 | B1 | 12/2003 | Kucik | |
| 6,751,552 | B1 | 6/2004 | Minelli | |
| 7,782,253 | B1 | 8/2010 | Brown | |
| 7,889,085 | B2 * | 2/2011 | Downey | G01S 19/19 368/108 |
| 8,265,900 | B2 | 9/2012 | Irlam et al. | |
| 8,638,229 | B2 | 1/2014 | Downey et al. | |
| 8,718,938 | B2 | 5/2014 | Wolf et al. | |
| 9,497,592 | B2 | 11/2016 | Venkatraman et al. | |
| 9,772,190 | B2 | 9/2017 | Erkkila et al. | |
| 10,627,525 | B2 | 4/2020 | Wu et al. | |
| 11,609,339 | B2 | 3/2023 | Wu et al. | |
| 2002/0109601 | A1 | 8/2002 | Arens | |
| 2005/0258968 | A1 | 11/2005 | Philippe et al. | |
| 2008/0218332 | A1 | 9/2008 | Lyons | |
| 2010/0204952 | A1 | 8/2010 | Irlam et al. | |
| 2011/0128824 | A1 | 6/2011 | Downey et al. | |
| 2013/0013198 | A1 | 1/2013 | Adrain | |
| 2014/0227628 | A1 * | 8/2014 | Tang | H01M 8/2485 429/498 |
| 2015/0105221 | A1 * | 4/2015 | Roush | G16H 20/30 482/8 |
| 2015/0192488 | A1 | 7/2015 | Xu et al. | |
| 2016/0101323 | A1 | 4/2016 | Erkkila et al. | |
| 2016/0174038 | A1 | 6/2016 | Menardais et al. | |
| 2016/0269868 | A1 | 9/2016 | Su et al. | |
| 2016/0314675 | A1 | 10/2016 | Hawsah | |
| 2017/0357007 | A1 | 12/2017 | Miller et al. | |
| 2018/0043210 | A1 * | 2/2018 | Niehaus | G01S 19/19 |
| 2018/0329075 | A1 | 11/2018 | Wu et al. | |
| 2020/0200914 | A1 | 6/2020 | Wu et al. | |
| 2023/0176229 | A1 | 6/2023 | Wu et al. | |

FOREIGN PATENT DOCUMENTS

| | | | |
|---|---|---|---|
| CN | 205121815 | U | 3/2016 |
| CN | 105488954 | A | 4/2016 |
| CN | 205177096 | U | 4/2016 |
| CN | 106128034 | A | 11/2016 |
| CN | 106448064 | A | 2/2017 |
| EP | 2535733 | A1 | 12/2012 |
| EP | 3622323 | B1 | 10/2025 |
| FR | 2832246 | A1 | 5/2003 |
| JP | 2016206744 | A | 12/2016 |
| JP | 2017049090 | A | 3/2017 |
| KR | 20130046250 | A | 5/2013 |
| WO | 2008118874 | | 10/2008 |
| WO | 2016003707 | A1 | 1/2016 |

OTHER PUBLICATIONS

International Search Report and Written Opinion—PCT/US2018/018344—ISA/EPO—May 17, 2018.

Rainmaker D.C., "Garmin Forerunner 735XT InDepth Review", Retrieved from internet on Jun. 10, 2017, https://www.dcrainmaker.com/2016/06/garminforerunner735xtindepthreview.html, pp. 1-58.

European Search Report—EP25208034—Search Authority—Munich—Feb. 16, 2026.

* cited by examiner

SWIMMING ACTIVITY MONITORING

CROSS-REFERENCE TO RELATED APPLICATION

This application is a continuation of U.S. application Ser. No. 18/161,663, filed Jan. 30, 2023, entitled "SWIMMING ACTIVITY MONITORING," now U.S. Pat. No. 12,050, 275, which is a continuation of U.S. application Ser. No. 16/752,310, filed Jan. 24, 2020, entitled "SWIMMING ACTIVITY MONITORING," now U.S. Pat. No. 11,609, 339, which is a continuation of U.S. application Ser. No. 15/711,130, filed Sep. 21, 2017, entitled "WATER-RELATED ACTION TRIGGERING," now U.S. Pat. No. 10,627,525, which claims the benefit of U.S. Provisional Application No. 62/504,402, filed May 10, 2017, entitled "WATER-RELATED ACTION TRIGGERING," each of which is assigned to the assignee hereof, and the entire contents of each of which are hereby incorporated herein by reference.

BACKGROUND

It is often desirable to know the location or position of someone or something relative to water. For example, a parent may want to know the location of a child relative to a pool, the ocean, etc. As another example, it may be desirable to know whether a piece of equipment has fallen into a body of water such as a pool. Knowing that any of such events has occurred, an action may be triggered such as retrieving the child or the piece of equipment from the body of water.

It is often desirable to track a location of an object over time. For example, wearables such as smart watches are becoming more popular. These devices are often used to report distance and path traveled by a user while exercising, e.g., swimming, biking, running, etc. A satellite positioning system unit in the wearable is used to track the distance and travel path. It is often desirable to track the distance traveled accurately and to display the particular path traveled accurately.

SUMMARY

An example of a mobile device includes: a sensor configured to provide a sensor signal, the sensor comprising a satellite positioning system (SPS) receiver, or a wireless communication signal receiver, or a motion sensor, or a gyroscope, or a combination thereof; and a processor communicatively coupled to the sensor and configured to: determine that the sensor signal is indicative of the mobile device being under water; and trigger an action based on the sensor signal being indicative of the mobile device having an action-inducing relationship to water.

Implementations of such a mobile device may include one or more of the following features. The sensor includes the SPS receiver, the sensor signal includes a received SPS signal, and the processor is configured to determine that an amplitude of the received SPS signal being below a threshold amplitude is indicative of the mobile device being under water. The processor is configured to determine that the amplitude of the received SPS signal being below the threshold amplitude is indicative of the mobile device being under water in response to receiving an indication that the mobile device is outside. The mobile device further includes a user input device and the indication that the mobile device is outside includes a user input received by the user input device, or the indication that the mobile device is outside includes a location most recently determined from signals received by the SPS receiver being outside, or a combination thereof. The processor is configured to determine that the mobile device is out of the water and the action comprises causing the SPS receiver to be ON while the mobile device is out of the water. The action comprises causing the SPS receiver to be OFF while the mobile device is below a threshold depth under the water. The action comprises causing only signals from the SPS receiver that are received when the mobile device is expected to be out of the water to be used to determine a distance from the mobile device to a satellite. The processor is configured to: determine a pattern of the mobile device being under water deeper than a threshold depth and being above the threshold depth; and schedule times, based on the pattern, for the SPS receiver to be ON such that the SPS receiver will be ON when the mobile device is expected to be out of the water.

Also or alternatively, implementations of such a mobile device may include one or more of the following features. The motion sensor includes an accelerometer, the mobile device further includes a user input device, and the processor is configured to determine that the sensor signal is indicative of the mobile device being under water by, in response to an indication from the user input device that a user of the mobile device is swimming, comparing the sensor signal to accelerometer data characteristic of swimming. The processor is configured to trigger the action in response to the sensor signal being, for longer than a threshold amount of time, indicative of the mobile device being under water. The processor is configured to trigger the action in response to the sensor signal being, for longer than the threshold amount of time, indicative of the mobile device being under water deeper than a threshold depth. The mobile device further includes a telecommunication transmitter and a telecommunication antenna, wherein the processor is configured to perform the action by sending an alert via the telecommunication transmitter and the telecommunication antenna. The processor is configured to: determine a reference temporal relationship of the mobile device to water; and trigger the action based on a deviation from the reference temporal relationship of the mobile device to water. The processor is configured to trigger the action based on the deviation existing for longer than a threshold amount of time.

An example of a method of triggering an action includes: determining that a mobile device is under water by: determining that an amplitude of a satellite positioning system (SPS) signal, or a wireless communication signal, or a combination thereof, received by the mobile device is below a threshold amplitude; or comparing data from a motion sensor of the mobile device with motion sensor data characteristic of entering water; or a combination thereof; determining that the mobile device has an action-inducing relationship to water; and taking the action in response to determining that the mobile device has the action-inducing relationship to water.

Implementations of such a method may include one or more of the following features. Determining that the mobile device is under water comprises determining that the amplitude of the SPS signal is below the threshold amplitude in combination with determining that the mobile device is outside. Determining that the mobile device is outside comprises: receiving a user input through a user input device of the mobile device indicating that the mobile device is outside; or determining that a location most recently determined from SPS signals received by the mobile device is outside; or a combination thereof. Further comprising determining that the mobile device is out of the water, where taking the action includes causing an SPS receiver of the mobile device to be ON while the mobile device is out of the water. Taking the action includes causing the SPS receiver to be OFF while the mobile device is below a threshold depth under the water. Taking the action includes causing only SPS signals that are received by the mobile device when the mobile device is expected to be out of the water to be used to determine a distance from the mobile device to a satellite. The method further includes: determining a pattern of the mobile device being under water deeper than a threshold depth and being above the threshold depth; and scheduling, based on the pattern, times for an SPS receiver of the mobile device to be ON such that the SPS receiver will be ON when the mobile device is expected to be out of the water. The motion sensor comprises an accelerometer and determining that the mobile device is under water includes, in response to receiving an indication from a user input device of the mobile device that a user of the mobile device is swimming, comparing data from the accelerometer of the mobile device with accelerometer data characteristic of swimming. Taking the action is performed in response to determining that the mobile device is under water for longer than a threshold amount of time. Taking the action is performed in response to determining that the mobile device is under water deeper than a threshold depth for longer than the threshold amount of time. Taking the action comprises sending an alert via a telecommunication antenna of the mobile device. The method further includes determining a reference temporal relationship of the mobile device to water, wherein taking the action is based on detecting a deviation from the reference temporal relationship of the mobile device to water. The method further includes controlling a frequency of determining whether the mobile device is under water based on a proximity of the mobile device to a body of water. Determining that the mobile device is under water further comprises measuring a pressure on the mobile device and comparing the pressure on the mobile device with a pressure associated with a threshold depth under water.

Another example of a mobile device includes: means for sensing, and producing a sensor signal corresponding to, a satellite positioning system signal, a wireless communication signal, an acceleration, or a combination thereof; means for determining that the sensor signal is indicative of the mobile device being under water; and means for triggering an action based on the sensor signal being indicative of the mobile device having an action-inducing relationship to water.

An example of a non-transitory, processor-readable storage medium includes processor-readable instructions configured to cause a processor to: determine that a mobile device is under water by: determining that an amplitude of a satellite positioning system (SPS) signal, or a wireless communication signal, or a combination thereof, received by the mobile device is below a threshold amplitude; or comparing data from a motion sensor of the mobile device with motion sensor data characteristic of swimming; or a combination thereof; determine that the mobile device has an action-inducing relationship to water; and take an action in response to determining that the mobile device has the action-inducing relationship to water.

DETAILED DESCRIPTION

Figure 1:
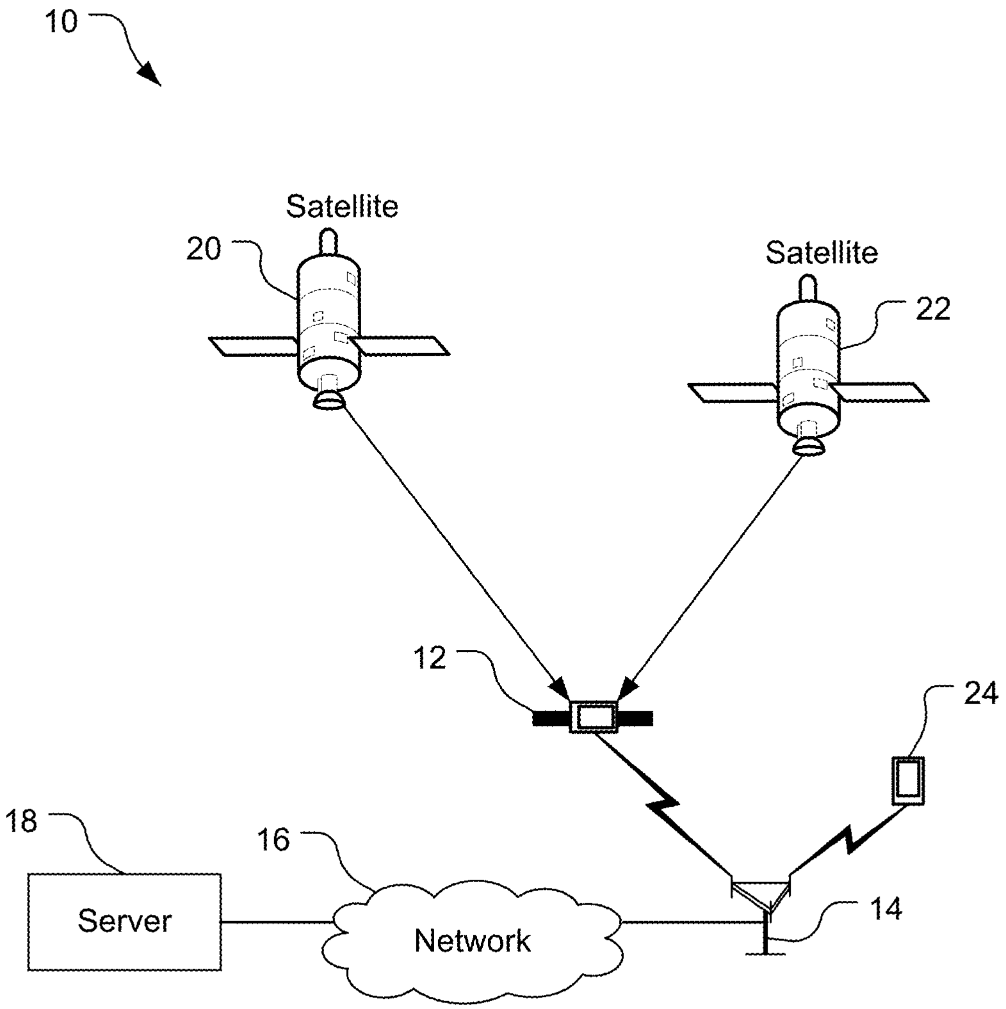
FIG. 1 is a simplified diagram of a communication system.

Techniques are discussed herein for determining the location of an object relative to a body of water. For example, techniques are discussed for determining that an object has moved from being out of the water to under the water, such as deeper than a threshold depth. As another example, techniques are discussed for determining that an object has moved from being deeper than a threshold depth under water to being above the threshold depth (or another threshold depth), e.g., while still remaining under the water or having exited the water. To determine whether an object is deeper than a threshold depth under water, satellite positioning system signals may be monitored. If the amplitude of the received satellite positioning system signal is below a threshold amplitude level, then the object may be determined to be deeper than the threshold depth under the water. If the amplitude of the received satellite positioning system signal is above the threshold amplitude level, or above a different threshold amplitude level, then the object may be determined to be above the threshold depth. The amplitude of the satellite positioning system signal may be combined with one or more other factors to determine whether the object is under water, out of water, deeper than the threshold depth under the water, shallower than the threshold depth under the water, etc. For example, a processor may combine the signal strength information with one or more other indications of whether the object is near water, indoors, etc.

Techniques are also discussed herein for triggering one or more actions in response to a determination regarding an object's position relative to a body of water and possibly one or more other factors. For example, one or more actions may be triggered depending on whether an object is out of water, under water, under water but at less than a threshold depth, under water deeper than the threshold depth, etc. Also or alternatively, one or more actions may be triggered if a pattern or history of an object being under water and being out of water changes. Also or alternatively, one or more actions may be triggered in response to a threshold amount of time being exceeded, such as an object being below water longer than a threshold time, and object being out of water longer than a threshold time, etc. Examples of actions that may be triggered are sending an alert, turning on and/or off one or more features of the object such as a satellite positioning system receiver and/or processing of received satellite positioning system signals. For example, in a smart watch being worn by a swimmer, a satellite positioning system receiver may be turned OFF while the smart watch is below a threshold depth of water. As another example, a pattern may be determined of the smart watch being below the threshold depth and receiving satellite positioning system signals of sufficient amplitude for processing, and a schedule determined for future times for turning the satellite positioning system receiver ON and OFF.

Items and/or techniques described herein may provide one or more of the following capabilities, as well as other capabilities not mentioned. Position determination accuracy may be improved for mobile devices worn during activities involving water such as swimming. Power consumption may be reduced for determining position of a mobile device worn during activity in water. Actions may be triggered based on a relationship of a device to water such as providing a notice and/or an alarm for undesired contact with water of a mobile device. Other capabilities may be provided and not every implementation according to the disclosure must provide any, let alone all, of the capabilities discussed.

Referring to FIG. 1, an example of a system 10 capable of providing location and communication services includes a mobile device 12 (which is a mobile wireless communication device), a base station 14, a communication network 16, a server 18, satellites 20, 22, and another mobile device 24. The system 10 is a communication system in that the system 10 can at least send and receive communications between components of the system and a wireless communication system in that the system can send at least some communications wirelessly. For example, communications may be sent wirelessly between the mobile device 12 and the base station 14, communications may be sent wirelessly between the mobile device 24 and the base station 14, communications may be sent between the base station 14 and the network 16, and communications may be sent between the network 16 and the server 18. Wired connections are shown between the base station 14 and the network 16, and between the network 16 and the server 18, although wireless connections may be provided. Positioning signals may be received wirelessly by the mobile device 12 (and possibly by the mobile device 24 although not shown in FIG. 1). Only one server 18 is shown for simplicity, but more than one server 18 may be used in the system 10, e.g., in various locations to provide quicker access as the system 10 may span large regions, e.g., entire countries or continents, or even the planet. Further, only one base station 14 is shown for simplicity, but numerous base stations are provided for communication with the mobile devices 12, 24 as these devices move. Further, only two satellites are shown for simplicity, but numerous satellites are provided for each satellite positioning system (SPS), and multiple SPSs (e.g., GPS, GLONASS, BDS, etc.) may be used by the mobile device 12 and/or the mobile device 24.

The base station 14 is configured to communicate wirelessly with the mobile devices 12, 24 via antennas. The base station 14 may also be referred to by one or more other names such as a base transceiver station, an access point, an access node (AN), a Node B, an evolved Node B (eNB), etc. The base station 14 is configured to communicate wirelessly with the mobile devices 12, 24 under control of the server 18 (via the network 16).

The mobile devices 12, 24 can be moved to various locations, including into and out of buildings, into and out of water, etc. The mobile devices 12, 24 may be referred to as access terminals (ATs), mobile devices, user equipment (UE), or subscriber units. The mobile device 12 shown in FIG. 1 is a smart watch, but other implementations of the mobile device 12 may be used. For example, other types of wearable mobile devices may be used, or other types of mobile devices that are not configured to be wearable by a user may be used. The mobile device 12 may be configured to be waterproof or water resistant. The mobile device 24 shown in FIG. 1 is a smart phone, but other types of mobile devices may be used, such as personal digital assistants, smart watches, table computers, laptop computers, notebook computers, etc. The mobile device 24 may be configured to be waterproof or water resistant.

Figure 2:
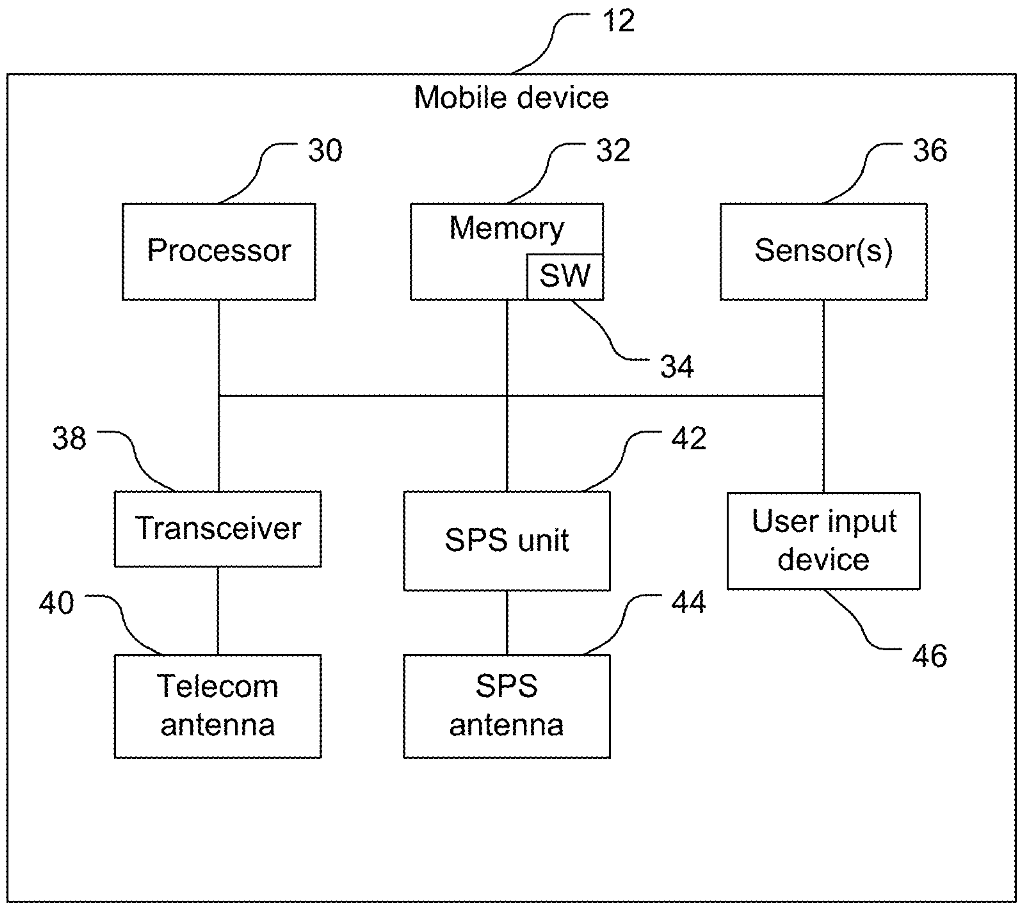
FIG. 2 is a block diagram of portions of a mobile shown in FIG. 1.

Referring also to FIG. 2, the mobile device 12 comprises a computer system including a processor 30, memory 32 including software 34, one or more sensors 36, a transceiver 38, a telecommunication (telecom) antenna 40, an SPS unit 42, an SPS antenna 44, and a user input device 46. The transceiver 38 and the telecom antenna 40 form a wireless communication system (e.g., a cellular, Wi-Fi, and/or short-range wireless (e.g., BLUETOOTH®) communication system including a wireless communication (e.g., cellular, Wi-Fi, and/or short-range wireless) signal receiver and a telecommunication (e.g., cellular, Wi-Fi, and/or short-range wireless) signal transmitter) that can communicate bi-directionally with the base station 14 (e.g., transmitting and receiving cellular signals). Other example mobile devices may have different configurations, e.g., with multiple transceivers and multiple telecom antennas for communicating with base stations of different cellular networks. The SPS antenna 44 is configured to receive SPS signals from the satellites 20, 22 and the transceiver is configured to process and transfer the SPS signals to the processor 30. The processor 30 is preferably an intelligent hardware device, e.g., a central processing unit (CPU) such as those made by QUALCOMM®, ARM®, Intel® Corporation, or AMD®, a microcontroller, an application specific integrated circuit (ASIC), etc. The processor 30 could comprise multiple separate physical entities that can be distributed in the mobile device 12. For example, the processing performed by the SPS unit 42 may be performed wholly or partially by the processor 30. The memory 32 is a non-transitory storage medium that includes random access memory (RAM) and read-only memory (ROM). The memory 32 stores the software 34 which is processor-readable, processor-executable software code containing instructions that are configured to, when executed, cause the processor 30 to perform various functions described herein (although the description may refer only to the processor 30, or the mobile device 12, performing the functions). Alternatively, the software 34 may not be directly executable by the processor 30 but configured to cause the processor 30, e.g., when compiled and executed, to perform the functions. The sensor(s) 36 and the user input device 46 are discussed in more detail below.

The mobile device 24 may be configured similarly to the mobile device 12, e.g., with at least a processor, memory, a transceiver, a telecom antenna, and a user input device such that the mobile device 24 can perform functions discussed herein. The mobile device 24 may also include an SPS unit, an SPS antenna, and one or more sensors.

Figure 3:
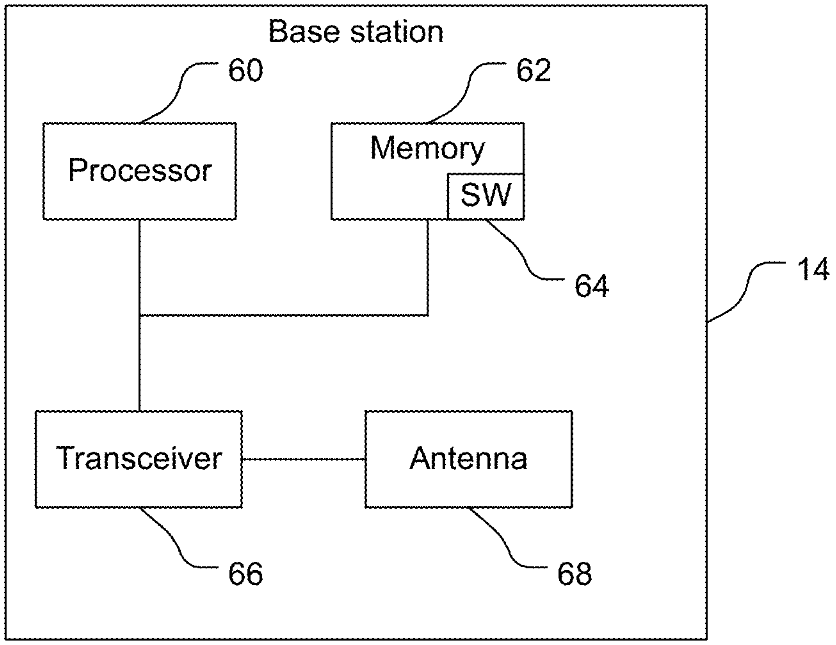
FIG. 3 is a block diagram of portions of a base station shown in FIG. 1.

Referring also to FIG. 3, the base station 14 comprises a computer system including a processor 60, memory 62 including software 64, a transceiver 66, and an antenna 68. While the base station 14 is shown with a single processor 60 and a single memory 62 (with corresponding software 64), the base station 14 may have a processor 60 and a memory 62 (with corresponding software 64) for each sector served by the base station 14, e.g., each of three sectors. The transceiver 66 and the antenna 68 form a wireless communication module configured to communicate bi-directionally with the mobile device 12. The processor 60 is preferably an intelligent hardware device, e.g., a central processing unit (CPU) such as those made by QUALCOMM®, ARM®, Intel® Corporation, or AMD®, a microcontroller, an application specific integrated circuit (ASIC), etc. The processor 60 could comprise multiple separate physical entities that can be distributed in the base station 14. The memory 62 is a non-transitory storage medium that includes random access memory (RAM) and read-only memory (ROM). The memory 62 stores the software 64, which is processor-readable, processor-executable software code containing instructions that are configured to, when executed, cause the processor 60 to perform various functions described herein (although the description may refer only to the processor 60, or the base station 14, performing the functions). Alternatively, the software 64 may not be directly executable by the processor 60, but configured to cause the processor 60, e.g., when compiled and executed, to perform the functions.

The mobile device 12 and the base station 14 are configured to communicate with each other wirelessly. The mobile device 12 and the base station 14 can send messages to each other that contain a variety of information. For example, the base station 14 can collect information from the sensor(s) 36 and send the information to the base station 14, e.g., for sending to the server 18 and/or to the mobile device 24.

Figure 4:
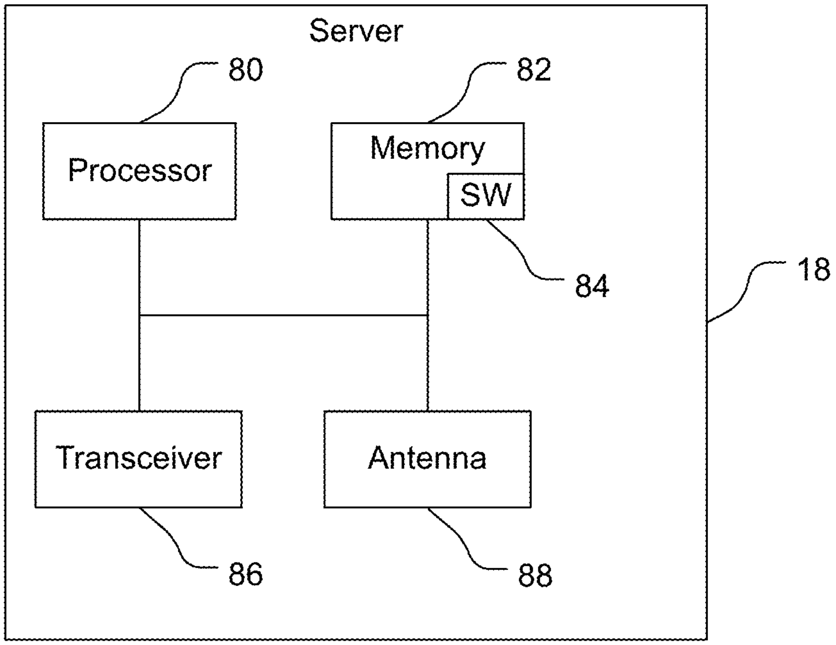
FIG. 4 is a block diagram of portions of a server shown in FIG. 1.

Referring also to FIG. 4, the server 18 comprises a computer system including a processor 80, memory 82 including software 84, and a transceiver 86, and an antenna 88. The processor 80 is preferably an intelligent hardware device, e.g., a central processing unit (CPU) such as those made by QUALCOMM®, ARM®, Intel® Corporation, or AMD®, a microcontroller, an application specific integrated circuit (ASIC), etc. The processor 80 could comprise multiple separate physical entities that can be distributed in the server 18. The memory 82 is a non-transitory storage medium that includes random access memory (RAM) and read-only memory (ROM). The memory 82 stores the software 84, which is processor-readable, processor-executable software code containing instructions that are configured to, when executed, cause the processor 80 to perform various functions described herein (although the description may refer only to the processor 80, or the server 18, performing the functions). Alternatively, the software 84 may not be directly executable by the processor 80, but configured to cause the processor 80, e.g., when compiled and executed, to perform the functions. The transceiver 86 is configured to send communications to and receive communications from the base station 14 through wired connections via the network 16.

Referring again to FIG. 2, with further reference to FIGS. 1 and 3-4, the sensor(s) 36 may include one or more sensors that may be used to help determine that the mobile device 12 is under water, including to help determine whether the mobile device 12 is below a threshold depth under the water. For simplicity, the use of the plural "sensors" herein includes the singular "sensor," and vice versa. The sensor 36 may obtain and/or produce signals and provide the signals, and/or indications thereof (although the indications are included in the term "signal" or "signals"), to the processor 30 for determining whether the mobile device 12 is under water, out of water, below a threshold depth of water, above a threshold depth of water, etc. If the threshold depth is 0 cm (or inches, etc.), then the threshold is the surface of the water and the determination of being deeper than the threshold becomes a determination of being under the water, i.e., submerged, and a determination of being above the threshold becomes a determination of being out of the water, i.e., not submerged.

The sensor 36 may include the SPS unit 42 and the SPS antenna 44 although the SPS unit 42 and the SPS antenna 44 are shown separate from the sensor 36 in FIG. 2. The SPS unit 42 and the SPS antenna 44 are configured to receive SPS signals from the satellites 20, 22 (and other satellites not shown). The SPS unit 42 is configured to process these signals, e.g., to identify the satellite(s) 20, 22 from which the signals originated and/or to determine a range to the source satellite(s). For example, the SPS unit 42 may integrate SPS signals over time, perform calculations on the integrated signals, and provide indications of these calculations to the processor 30 for further analysis. For example, the SPS unit 42 may integrate in-phase (I) and quadrature phase (Q) SPS signals, square each of these signals, add the squares, and take a square root of the sum. That is, the SPS unit 42 may calculate an I/Q Signal Amplitude according to:

$$I/Q \text{ amplitude} = IQA = \sqrt{I^2 + Q^2}$$

The SPS unit 42 is configured to provide the I/Q Signal Amplitude IQA over time to the processor 30. For example, referring to FIG. 5, a plot of IQA 100 over time for the mobile device 12 while being worn by a user that is swimming. As shown, the IQA 100 repeatedly swings between a relatively high amplitude and a relatively low amplitude as the user's arm goes in and out of the water with an amplitude 102 being the IQA 100 when the mobile device 12 is at the surface of the water. As shown, the IQA 100 drops significantly with the mobile device 12 under the water, with the IQA 100 being so low that the SPS signal is essentially nonexistent once the mobile device 12 is less than about 25 cm below the surface of the water. The IQA 100 reported by the SPS unit 42 to the processor 30 may be from one or more of the satellites 20, 22, and/or may be from one satellite constellation from multiple available satellite constellations. For example, the SPS unit 42 may provide the IQA 100 only for a single one of the satellites 20, 22 during a select period of time such as a training period of time. As another example, the SPS unit 42 may provide the IQA 100 only for one or more satellites from one satellite constellation from multiple available constellations such as GPS (global positioning system, used in the United States), GLONASS (Russia's SPS), BDS (China's SPS), etc. Further discussion of use of the IQA 100 by the processor 30 is provided below.

The sensor 36 may include a telecommunication receiver, e.g., a cellular signal receiver, of the transceiver 38. The cellular signal receiver is configured to produce and provide signals indicative of received cellular signals to the processor 30. These signals are referred to as cellular signals, and the processor 30 may analyze these cellular signals for communication purposes and for determining a relationship of the mobile device 12 to water, e.g., under water, a depth under water, etc.

The sensor 36 may include a motion sensor such as an accelerometer and/or a vibration sensor, a gyroscope, and/or a pressure sensor. The motion sensor is configured to produce signals indicative of motion of the mobile device 12, such as acceleration, and to provide these signals to the processor 30. The processor 30 may compare measured motion sensor data (e.g., accelerometer data, vibration data) with motion sensor data (e.g., accelerometer data, vibration data) characteristic of swimming, e.g., as stored in the memory 32 or provided by the server 18 or obtained in another manner. If the measured motion sensor data from the sensor 36 correlates well to the motion sensor data characteristic of swimming, then the processor 30 can conclude that the mobile device 12 is under water (at least during portions of a cycle of the accelerometer data associated with being under water). Similarly, the pressure sensor is configured to measure pressure on the mobile device 12 and to produce signals indicative of pressure on the mobile device 12 and to provide these signals to the processor 30. The processor 30 may be configured to determine that the mobile device is under water based on the measuring of the pressure on the mobile device 12. For example, the processor 30 may determine that the mobile device 12 is under water if the pressure exceeds a threshold pressure such as 1 atmosphere, 1.1 atmospheres, or another pressure threshold. Also or alternatively, measured gyroscope data can be compared with gyroscope data (e.g., orientation) indicative of entering and exiting water to determine when the mobile device 12 is under and out of water.

The user input device 46 is configured to provide an interface to a user and to receive information from the user. The user input device 46 may include, for example, a touch-sensitive screen, a keyboard, a microphone, and/or a data input jack (e.g., a micro-USB jack). The user input device 46 may receive input from the user such as a selection of a smart phone app such as a fitness-tracking app. Further the user input device 46 may receive selections within the app such as an indication that the user is swimming (e.g., that the user is starting a swimming workout indicating that the user is or imminently will be swimming), whether the user is swimming indoors or outdoors, how long of a pool the user will be swimming in, that the user is running, etc.

The user input device 46 may also receive information regarding one or more conditions (e.g., thresholds, occurrences, etc.) and one or more actions that are to be taken in response to the one or more conditions that are satisfied. As used herein, the use of the plural "conditions" includes the singular and vice versa. Similarly, the use of the plural "actions" includes the singular and vice versa. Further, "condition" may include a portion of a condition where the condition comprises multiple criteria. As an example of a condition and an action, a user may specify a threshold amount of time that the mobile device 12 may be under water before an alert is sent to the mobile device 24. The user may also provide information for the mobile device 24, such as a phone number, for use in implementing an action. As another example, the user may specify that any entry into water by the mobile device 12 should trigger an action such as an alert. As another example, the user may specify an activity such as by selecting a prompt on a display screen, and the activity may include associated conditions and/or actions. For example, if the user selects an activity of swimming, then a default condition may be being below water for greater than a threshold amount of time such as 20 seconds before an alert is triggered. Further, the condition may vary based upon the user. For example, a threshold amount of time for being underwater to trigger an alert may be shorter if the user is 10 years old than if the user is 20 years old. Further still, the condition may change over time due to learning by the processor 30 from feedback (e.g., user feedback, collected sensor data, etc.). For example, while an initial threshold amount of time for being underwater to trigger an alert may be 10 seconds, if the mobile device 12, when being used by a particular user, stays underwater beyond this threshold amount of time on numerous occasions without incident, then the condition may be changed for that user. For example, the condition may be changed from a 10 second threshold to a longer threshold, e.g., an average of the amounts of time that the mobile device 12 is underwater exceeding the initial threshold with that user.

Also or alternatively, one or more conditions and/or one or more actions may be provided by the mobile device 24, such as by a parent remotely configuring a child's mobile device to set the condition and/or the action to be taken. The input from the mobile device 24 may be received by the mobile device 12 and/or the server 18. Thus, the mobile device 24 may be configured to establish conditions to be monitored by the mobile device 12 and actions to be taken by the mobile device 12 in response to satisfaction of the conditions. Also or alternatively, the mobile device 24 may establish conditions to be monitored by the server 18 and actions to be taken by the server 18 in response to satisfaction of the conditions. For example, a user of the mobile device 24 may instruct the server 18 to send an alert to the mobile device 24 in response to the mobile device 12 being underwater for more than a threshold amount of time, or in response to loss of signal or lack of a periodic check-in by the mobile device 12, etc.

A condition for triggering an action may be or be based on a pattern or history of activity. If data collected by the sensor 36 shows a repeating pattern, then the pattern may be used to detect a deviation from the pattern, with the deviation from the pattern being a condition for triggering an action. For example, if data from an accelerometer or from the SPS unit 42 have a repeating nature, e.g., indicating cyclical entry into and exit from water, then a deviation from this nature, e.g., indicating a prolonged stay underwater, may trigger an action such as an alert being sent to the mobile device 24. Also or alternatively, if data collected by the sensor 36, while possibly not showing a repeating pattern, has one or more characteristics that can be quantified as a baseline (e.g., being typical or a norm), then these data may be used to determine deviations from the baseline to trigger an action. For example, if the mobile device 12 is worn by a child playing in the pool, then the entry into and exit from water may be random, but an average amount of time spent underwater may be determined and a prolonged stay underwater relative to this average may trigger an alert being sent to the mobile device 24.

Various default conditions and actions may be encoded into the memory 32 such that the processor 30 may monitor a default condition and trigger a default action in response to the corresponding default condition being satisfied. For example, in addition to or instead of defaults discussed above, a default condition may be the mobile device 12 being deeper than a threshold depth, and a corresponding default action may be to send an alert. As another example, a default condition may be loss of an SPS signal and a corresponding default action may be to turn OFF the SPS unit 42 or at least turn OFF a receiver of the SPS unit 42 during times of SPS signal loss.

The processor 30 is configured to monitor indications from the sensor 36 for satisfaction of conditions in response to which the processor 30 may trigger actions. Also or alternatively, the server 18 and in particular the processor 80 may be configured to monitor signals from the mobile device 12 for satisfaction of conditions in response to which the processor 80 may trigger actions.

Figure 5:
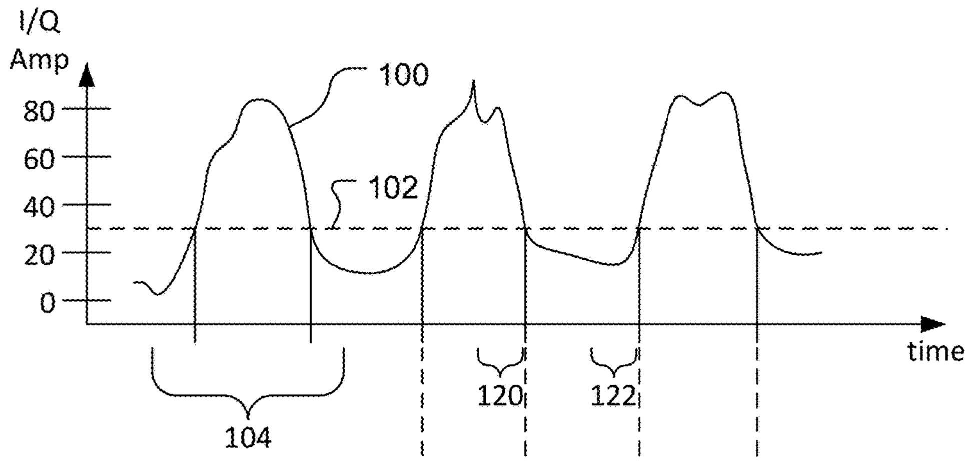
FIG. 5 is a timing diagram of amplitude of satellite positioning signals received by a wearable receiver worn by a swimmer.
Figure 6:
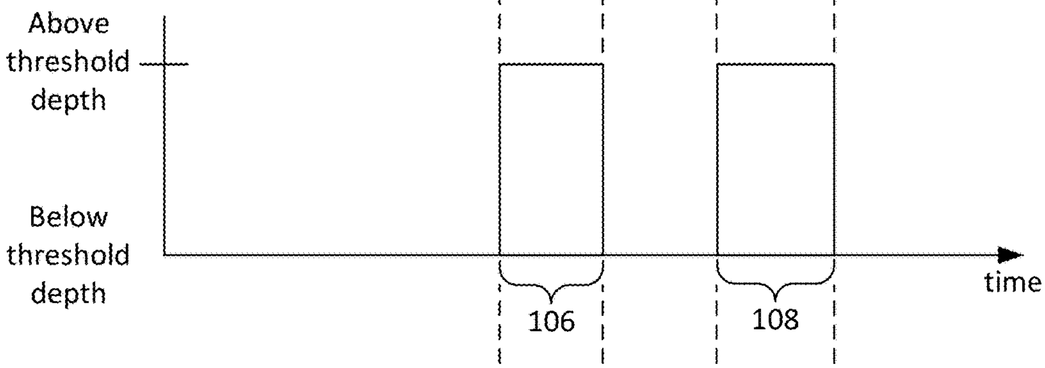
FIG. 6 is a timing diagram indicating whether the wearable receiver of FIG. 5 is above water.

Referring again to FIG. 5, with further reference to FIGS. 1-4, the processor 30 may be configured to monitor the IQA 100 indicated by the SPS unit 42, and/or amplitudes of cellular signals from the transceiver 38, for satisfaction of conditions in triggering of actions. While the IQA 100 and/or the cellular signals may be analyzed, for simplicity the discussion herein focuses on the IQA, but the discussion is applicable to the cellular signals, or a combination (e.g., an average) of the IQA 100 and the cellular signals. The processor 30 may analyze the IQA 100 during a training window 104 to determine characteristics of the IQA 100. While FIG. 5 shows the training window 104 as only including one cycle of the IQA 100, corresponding to one stroke of the user of the mobile device 12 while swimming, the training window 104 typically would include multiple cycles of the IQA 100 for a repeating pattern of the IQA 100 in order to determine characteristics of the pattern. Further, the processor 30 may be configured to repeat the training, e.g., intermittently (e.g., periodically) determining (including redetermining) the characteristics of the IQA 100 in this example. Examples of the characteristics may include average time above water, average time below water, average time above a threshold amplitude of the IQA 100, average time below a threshold amplitude of the IQA 100, a period of cycles of a repeating pattern, timing of a characteristics such as peak IQA in a cycle, etc. While the discussion of FIGS. 5-8 focuses on the analysis of the IQA 100, one or more other characteristics may be used instead of, or in addition to, the IQA 100.

The processor 30 may be configured to determine a pattern of the IQA 100 to estimate future times of characteristics of the IQA 100. For example, the processor 30 may be configured to estimate future time windows during which the IQA 100 is expected to exceed the amplitude 102. Also or alternatively, the processor 30 may be configured to estimate future time windows during which the IQA 100 is expected to exceed another threshold amplitude, and/or to be below another threshold amplitude, etc.

Figure 7:
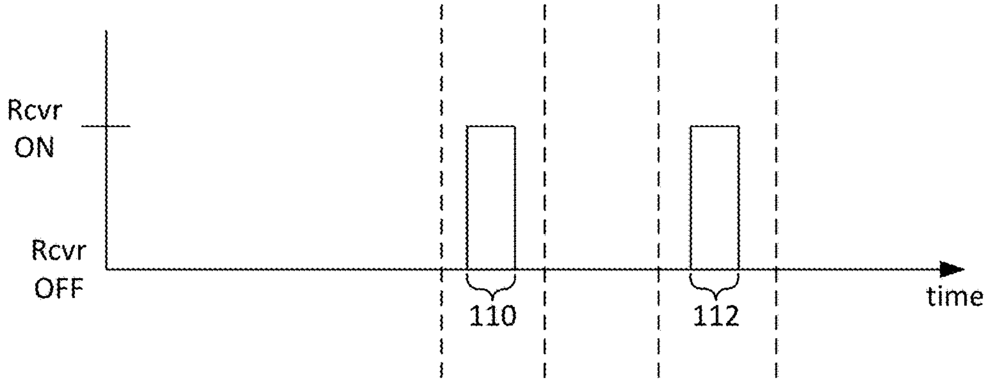
FIG. 7 is a timing diagram of operation of a receiver of a satellite positioning system unit shown in FIG. 2.
Figure 8:
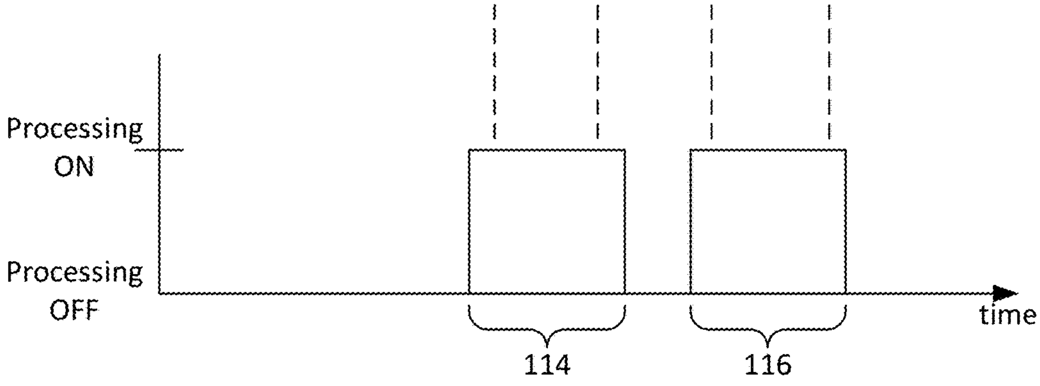
FIG. 8 is a timing diagram of processing of satellite positioning system signals.

The processor 30 may be configured to determine future time windows to activate various actions based on the determined timing of the IQA 100 meeting various conditions. For example, referring also to FIG. 6, the processor 30 may be configured to determine time windows 106, 108 during which the IQA 100 will exceed the amplitude 102, here with the mobile device 12 being above water. When the mobile device 12 is above water, the SPS IQA after PN (pseudorandom number code) correlation has a high amplitude (including SPS signal and noise) while when the mobile device 12 is below water, the SPS IQA after PN correlation will have a low amplitude (essentially noise only). Referring also to FIG. 7, the processor 30 may be configured to determine, e.g., based on the time windows 106, 108, time windows 110, 112 for causing the receiver of the SPS unit 42 to be ON, and to be OFF at other times. For example, the processor 30 may determine the time windows 110, 112 as a middle portion (e.g., the middle 50%) of the time windows 106, 108. Turning the receiver of the SPS unit 42 OFF when not able to receive enough energy to use to determine the location of the mobile device 12 can provide a tremendous power savings, e.g., greater than 50% in the swimming scenario. Also or alternatively, the time windows 110, 112 may be used by the processor 30 to trigger processing of signals received from the SPS 42 by the processor 30, and thus to integrate only over the time windows 110, 112 (and other similar windows), i.e., with the SPS signal including significant signal power and not just noise. Turning the receiver of the SPS unit 42 OFF and/or not processing signals from the SPS unit 42 by the processor 30 during times of poor signal reception can improve location determination by eliminating use of noisy or even purely noise signals from the SPS unit 42 in determining location of the mobile device 12. This may reduce signal-to-noise ratio (SNR) loss, e.g., by about 2 dB or more. Referring also to FIG. 8, the processor 30 may be configured to determine, e.g., based on the time windows 106, 108, time windows 114, 116 for the processor 30 to trigger processing of the SPS signals received from the SPS unit 42. Also or alternatively, the time windows 114, 116 may be used by the processor 30 to cause the receiver of the SPS unit 42 to be ON, and to be OFF at other times. The time windows 114, 116 may be based on the time windows 106, 108, or may be based on one or more other criteria such as another threshold amplitude, in this case a threshold amplitude below the amplitude 102 (as the windows 114, 116 are wider than the time the IQA 100 is below the amplitude 102). Still other time windows may be determined and may or may not be based on the time windows 106, 108. For example, the processor 30 may determine time windows 120, 122 for receipt of SPS signals to be processed to determine Doppler measurements, e.g., with such time windows spanning times where a speed of the mobile device 12 is expected to be close to a speed of the body of the user. This may help improve the Doppler measurement by using signals for carrier-phase-based measurements that are strong and/or by avoiding integrating a signal, for code-phase measurements, during a time that the signal strength is low, resulting in reporting a time stamp that does not correspond to a time window throughout which the SPS signal is strong.

Also or alternatively, the processor 30 may be configured to trigger one or more actions without being scheduled. For example, the processor 30 may be configured to determine that the mobile device 12 has moved from being below water to being above water (e.g., the beginning of the time window 106) and to turn the receiver of the SPS unit 42 ON, either immediately or after some amount of time. The processor 30 may cause the receiver of the SPS unit 42 to remain ON for a specified amount of time or may cause the SPS receiver to turn OFF in response to the processor 30 determining that the mobile device moved from being above water to below water (e.g. the end of the time window 106). As another example, the processor 30 may be configured to control a frequency at which the processor 30 triggers in-water detection based on the proximity of the mobile device 12 to a body of water (e.g., a river, pond, lake, ocean, etc.), with the frequency increasing as the distance of the mobile device 12 to water decreases. The frequency may, for example, be set to zero, i.e., in-water detection turned off, if the mobile device 12 is not near water, e.g., a most-recently-determined location of the mobile device 12 is displace from water (e.g., outside a threshold distance of a body of water, such as within 10 meters, 20 meters, 50 meters, or some other distance). Conversely, the frequency may, for example, be set to one or more non-zero values (with frequency values being a function of distance to water), i.e., in-water detection turned on, if the mobile device 12 is near water, e.g., a most-recently-determined location of the mobile device 12 is proximate water (e.g., within a threshold distance of a body of water, such as within 10 meters, 20 meters, 50 meters, or some other distance). These examples of triggering actions are not exhaustive and numerous other examples of configurations of the processor 30 triggering non-scheduled actions are possible, including other triggers, other determinations of the triggers, other timings of the triggered actions, and/or other actions themselves.

While in FIG. 5, the amplitude 102 corresponds to the threshold between the mobile device 12 being underwater and being above or out of water, other thresholds may be used. For example, the processor 30 may use a threshold amplitude that is slightly below the amplitude 102 because sufficient SPS signal energy may be received by the mobile device 12 while slightly (e.g., less than 30 cm) under water for accurate location determination of the mobile device 12. This may be useful in cases, for example, where the mobile device 12 may not be out of water often such as when the user of the mobile device 12 is swimming using the breast stroke or the side stroke.

Further, while the IQA 100 shown in FIG. 5 corresponds to the amplitude of received SPS signals, information from the accelerometer and/or the pressure sensor may be analyzed by the processor 30 to determine satisfaction of one or more conditions. In the example of the user of the mobile device 12 swimming, plots of acceleration and/or pressure may be similar in shape to the IQA 100 shown in FIG. 5. Even if not similar to the IQA 100, the data from the accelerometer and/or the pressure sensor may be cyclic and repetitive such that the processor 30 can determine future time windows for triggering actions such as turning the receiver of the SPS unit 42 ON and/or processing signals from the SPS unit 42, or may determine on the fly (i.e., not in advance) to trigger (i.e., initiate) an action.

The processor 30 may be configured to determine satisfaction of any of the conditions discussed above and to trigger appropriate corresponding actions. For example, the processor 30 may be configured to determine typical characteristics and/or patterns of sensor data, detect deviations from the typical characteristics, and trigger actions in response to such deviations.

The processor 30 may be configured to determine the satisfaction of a condition based on multiple inputs. For example, the processor 30 may be configured to determine the satisfaction of a condition based on SPS signal data and information from a timer, for example that the mobile device 12 has been below water to trigger a timer, and to determine that another condition is met once the timer expires or exceeds a value (i.e., that the mobile device 12 has been below water for more than a threshold amount of time). As another example, the processor 30 may be configured to determine the satisfaction of a condition based on SPS signal data indicating that the mobile device has been below a non-zero threshold depth of water in addition to a timer exceeding a threshold amount of time. As another example, the processor 30 may be configured to analyze SPS signal data, and/or pressure data, and/or accelerometer data, and/or one or more criteria input by the user such as a threshold amount of time.

The multiple inputs analyzed by the processor 30 may include input from a user. The processor 30 may establish and/or alter one or more criteria for a condition being met (e.g., threshold IQA) based on an indication from the user (e.g., what swimming stroke is used). For example, if the user will be swimming with the crawl, then the processor 30 may actuate the SPS receiver only when the mobile device 12 is above water (e.g., the IQA 100 is above the threshold amplitude 102 corresponding to the mobile device 12 being above water), and perhaps above a threshold that is above the amplitude 102. Conversely, if the user will be swimming with the breast stroke, then the processor 30 may actuate the SPS receiver when the mobile device 12 is below water but above a threshold depth (e.g., the IQA 100 is above a threshold amplitude, that is below the amplitude 102, corresponding to the mobile device 12 being below water but able to receive enough SPS signal for location determination). As another example, the processor 30 may be configured to respond to the user indicating that the user will be swimming, and the SPS unit 42 having poor SPS signal reception, by asking the user if the user is swimming indoors. The processor 30 may be configured to respond to the user indicating that the user will be swimming indoors by prompting the user for information about the pool in which the user will be swimming. The processor 30 may use this information (e.g., swim lane, pool length, etc.) to continue to track the mobile device 12 even if there is insufficient SPS signal information (e.g., signals from too few satellites) to track the mobile device independently (i.e., without the information provided by the user).

Still other examples of combinations of criteria (either default, user input, or otherwise obtained) for satisfying a condition are possible. For example, the processor 30 may monitor for the mobile device 12 entering water if an activity associated with the mobile device 12 is not associated with being under water, e.g., running, playing basketball, or attending a party, or if a condition of the mobile device 12 not being expected to be under water is set, e.g., a parent indicating that the mobile device 12 should not be wet. Location may be used in conjunction with an activity to establish a condition. For example, if swimming is the selected activity, and an SPS location of the mobile device 12 is not near any buildings, then the processor 30 may apply default conditions for outdoor swimming, e.g., intermittently turning ON and OFF the SPS receiver as discussed above.

The server 18 may be configured to evaluate conditions and trigger actions as well. For example, the server 18 may be configured to monitor signals from the mobile device 12 to determine whether a condition has been satisfied. The server 18 may, for example, monitor locations that are determined by the mobile device 12 and that are reported intermittently to the server 18. In response to intermittent reports ending, or no new report being received as expected (e.g., for longer than a threshold amount of time), the server 18 may trigger an action. For example, the server 18 may perform an action specified by the user of the mobile device 24 such as sending an alert to the mobile device 24. This alert may include information such as an indication that communication with the mobile device 12 has ceased for longer than a threshold amount of time, and/or other information such as a last-reported location of the mobile device 12. The server 18 may be configured to duplicate determination of conditions being met and/or actions being taken if appropriate information for doing so is provided to the server 18.

Figure 9:
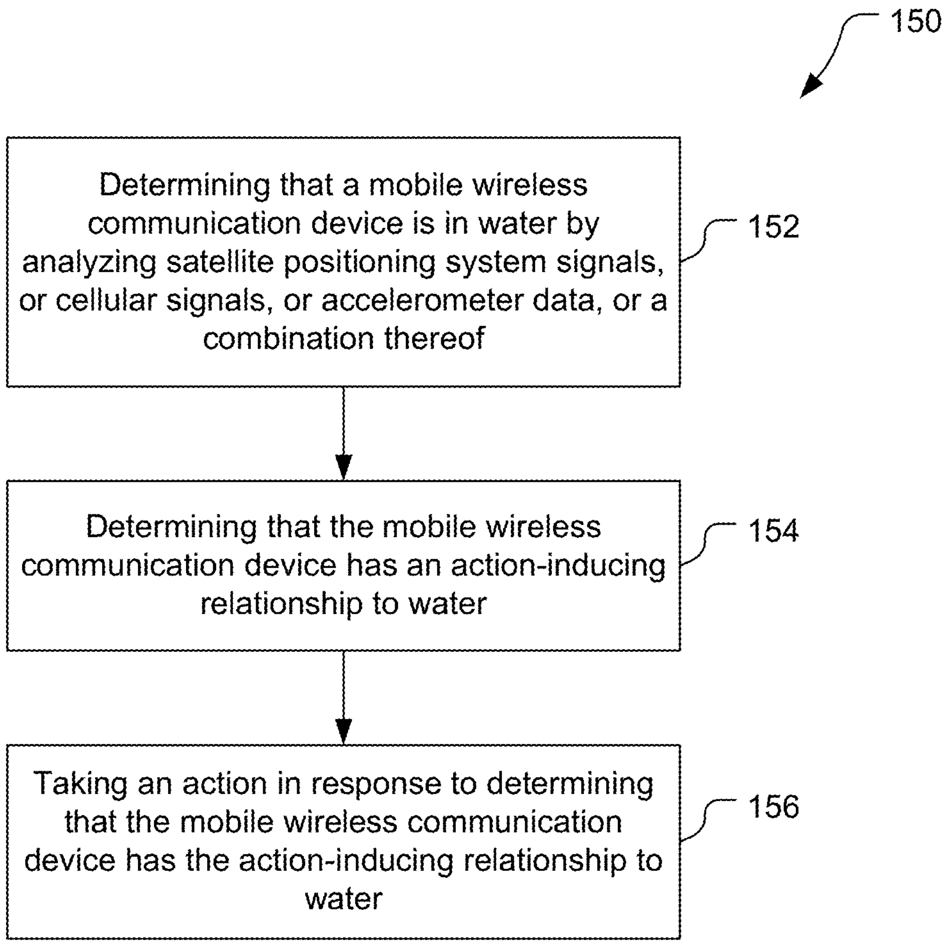
FIG. 9 is a block flow diagram of a method of triggering an action.

Referring to FIG. 9, with further reference to FIGS. 1-8, a method 150 of triggering an action includes the stages shown. The method 150 is, however, an example only and not limiting. The method 150 may be altered, e.g., by having stages added, removed, rearranged, combined, performed concurrently, and/or having single stages split into multiple stages.

At stage 152, the method 150 includes determining that a mobile device is under water by analyzing satellite positioning system signals, or cellular signals, or accelerometer data, or a combination thereof. A sensor signal may be produced indicative of one or more of the SPS signals, cellular signals, and/or accelerometer data (with the sensor signal possibly including multiple signals). For example, the method 150 may include the processor 30 (and/or another device such as the server 18) determining that an amplitude of a satellite positioning system (SPS) signal (and/or a cellular signal) received by the mobile device is below a threshold amplitude, or comparing data from an accelerometer of the mobile device with accelerometer data characteristic of entering water (e.g., of swimming), or a combination thereof. The processor 30 may, for example, analyze the IQA 100 to determine whether the IQA 100 is below a threshold amplitude, indicating that the SPS unit 42 is not receiving sufficient SPS signal for location determination. The processor 30 may use the SPS amplitude information in combination with other information, e.g., location information, and only conclude that a lack of sufficient SPS exists if a last known location of the mobile device 12 was in or near water (e.g., if a user indicated that the user would be in water such as swimming). The processor 30 may compare accelerometer data with accelerometer data characteristic of swimming, e.g., as stored in the memory 32 or provided by the server 18 or obtained in another manner. The processor 30 may compare these data in response to receiving an indication from the user input device 46 that a user of the mobile 12 device is swimming (e.g., an indication of a user selection of a fitness app and swimming as the activity). The sensor 36 may measure a pressure on the mobile device 12 and the mobile device 12 may conclude that the mobile device is under water based on this pressure, e.g., if the pressure exceeds a pressure threshold such as 1 atmosphere, or 1.1 atmosphere, or another threshold.

The processor 30 may use a combination of the information to determine that the mobile device 12 is under water, e.g., requiring at least two of these information types to indicate that the mobile device 12 is under water before concluding that the mobile device 12 is under water, or requiring at least one information type to indicate that the mobile device 12 is under water and no information type to be inconsistent with the mobile device 12 being under water, or another combination. For example, determining that the mobile device is under water may comprise determining that the amplitude of the SPS signal is below the threshold amplitude in combination with determining that the mobile device is outside. Further, determining that the mobile device is outside may comprise: receiving a user input through a user input device of the mobile device indicating that the mobile device is outside; determining that a location most recently determined from signals received by the SPS receiver is outside; or a combination thereof. Thus, for example, the processor 30 may receive input through the user input device 46 that the mobile device 12 is outside, or the processor 30 may determine that the last known SPS-based location for the mobile device 12 is outside.

At stage 154, the method 150 includes determining that the mobile device has an action-inducing relationship to water. For example, the processor 30 may use information about the mobile device being under water to determine that the mobile device is under water, that the mobile device 12 has been under water longer than a threshold time, that the mobile device 12 is deeper under water than a non-zero threshold depth, that the mobile device 12 is out of water, that the mobile device has been out of water longer than a threshold time, that the mobile device 12 is above a threshold depth under water, that the mobile device 12 has deviated from a pattern or norm with respect to water, or any other action-inducing relationship to water, or a combination of any of these. The action-inducing relationship to water may be a combination of criteria, and one or more criteria may be a default, may be dependent on one or more other criteria, may be user specified, or obtained by other means.

At stage 156, the method 150 includes taking an action in response to determining that the mobile device has the action-inducing relationship to water. For example, the processor 30 may determine that the mobile device 12 is out of the water and may cause a receiver of the SPS unit 42 to be ON only while the mobile device 12 is out of the water (e.g., see FIG. 7), e.g., turning the SPS unit 42 ON in response to determining that the mobile device 12 exits, or is otherwise out of (not under), water. As another example, the processor 30 may cause the SPS receiver to be OFF while the mobile device is below a threshold depth under the water (see FIG. 7), e.g., turning the SPS unit 42 OFF in response to determining that the mobile device 12 is under, e.g., enters, water. As another example, the processor 30 may cause only signals from the SPS receiver that are received when the mobile device 12 is expected to be out of the water to be used (see FIG. 8) to determine a distance from the mobile device 12 to a satellite, e.g., one of the satellites 20, 22. As another example, the action may comprise sending an alert via the telecom antenna 40 of the mobile device 12 (or from the server 18). Taking the action may be performed in response to determining that the mobile device is under water for longer than a threshold amount of time. Taking the action may be performed in response to determining that the mobile device is under water deeper than a threshold depth for longer than a threshold amount of time.

The method 150 may include one or more further features. As an example, determining that the mobile device is under water may also comprise measuring a pressure on the mobile device, e.g., using a pressure sensor and a processor such as a pressure sensor of the sensor 36 and the processor 30. As another example, the method 150 may further comprise determining a pattern of the mobile device being under water deeper than a threshold depth and being above the threshold depth, and scheduling times for the SPS receiver to be ON based on the pattern (see FIGS. 5 and 7). The threshold depth may be zero such that the pattern is of being under water and out of water. As another example, the method 150 may further comprise determining a reference temporal relationship of the mobile device to water, where taking the action is based on detecting a deviation from the reference temporal relationship of the mobile device to water. Taking the action may be based on the deviation existing for longer than a threshold amount of time. The action may be, for example, sounding an alarm (e.g., that may be heard by persons under water such as in a pool) that may cause a rescue to be made of a user of the mobile device 12.

Other Considerations

Other examples and implementations are within the scope and spirit of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

Also, as used herein, "or" as used in a list of items prefaced by "at least one of" or prefaced by "one or more of" indicates a disjunctive list such that, for example, a list of "at least one of A, B, or C," or a list of "one or more of A, B, or C," or "A, B, or C, or a combination thereof" means A or B or C or AB or AC or BC or ABC (i.e., A and B and C), or combinations with more than one feature (e.g., AA, AAB, ABBC, etc.).

As used herein, unless otherwise stated, a statement that a function or operation is "based on" an item or condition means that the function or operation is based on the stated item or condition and may be based on one or more items and/or conditions in addition to the stated item or condition.

Further, an indication that information is sent or transmitted, or a statement of sending or transmitting information, "to" an entity does not require completion of the communication. Such indications or statements include situations where the information is conveyed from a sending entity but does not reach an intended recipient of the information. The intended recipient, even if not actually receiving the information, may still be referred to as a receiving entity, e.g., a receiving execution environment. Further, an entity that is configured to send or transmit information "to" an intended recipient is not required to be configured to complete the delivery of the information to the intended recipient. For example, the entity may provide the information, with an indication of the intended recipient, to another entity that is capable of forwarding the information along with an indication of the intended recipient.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "mobile wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

The terms "machine-readable medium" and "computer-readable medium," as used herein, refer to any medium that participates in providing data that causes a machine to operate in a specific fashion. Using a computer system, various computer-readable media might be involved in providing instructions/code to processor(s) for execution and/or might be used to store and/or carry such instructions/code (e.g., as signals). In many implementations, a computer-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to one or more processors for execution. Merely by way of example, the instructions may initially be carried on a magnetic disk and/or optical disc of a remote computer. A remote computer might load the instructions into its dynamic memory and send the instructions as signals over a transmission medium to be received and/or executed by a computer system.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, some operations may be performed in parallel or concurrently. In addition, the order of the operations may be rearranged. A process may have additional stages or functions not included in the figure. Furthermore, examples of the methods may be implemented by hardware, software, firmware, middleware, microcode, hardware description languages, or any combination thereof. When implemented in software, firmware, middleware, or microcode, the program code or code segments to perform the tasks may be stored in a non-transitory computer-readable medium such as a storage medium. Processors may perform one or more of the described tasks.

Components, functional or otherwise, shown in the figures and/or discussed herein as being connected or communicating with each other are communicatively coupled. That is, they may be directly or indirectly connected to enable communication between them.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

Various terms as used herein in the plural include the singular, and as used herein in the singular include the plural. The terms "sensors," "conditions," and "actions" were specifically mentioned above, but this list is not exhaustive and other terms may be used in the singular or plural but include the plural and the singular, respectively.

Further, more than one invention may be disclosed.

What is claimed is:

1. A mobile device comprising:

a user input device;

a satellite positioning system (SPS) receiver;

a wireless communication signal transceiver;

at least one motion sensor; and a processor communicatively coupled to the user input device and the SPS receiver, the processor being configured to:

receive, from the user input device, a swimming indication of swimming by a user; and determine, in response to the swimming indication, timing of a characteristic associated with a swimming stroke based on an in-phase/quadrature phase amplitude of one or more signals received by the SPS receiver.

2. The mobile device of claim 1, wherein, to determine the swimming stroke, the processor is configured to:

determine the swimming stroke further based on a swim stroke indication received by the user input device.

3. The mobile device of claim 1, wherein the swimming indication comprises an indication of a pool length.

4. The mobile device of claim 1, wherein, to determine the swimming stroke, the processor is configured to:

determine whether the mobile device is above water.

5. The mobile device of claim 1, wherein, to determine the swimming stroke, the processor is configured to:

determine whether the mobile device is within a threshold distance below water.

6. The mobile device of claim 1, wherein the processor is configured to:

determine a pattern of movement of the mobile device, wherein, to determine the swimming stroke, the processor is further configured to:

determine the swimming stroke further based on the determined pattern of movement of the mobile device.

7. The mobile device of claim 1, wherein the mobile device is configured to be wearable by a person.

8. The mobile device of claim 7, wherein the mobile device comprises a watch.

9. A swimming stroke determination method comprising:

receiving, at a mobile device from a user input device of the mobile device, a swimming indication of swimming by a user; and determining, in response to the swimming indication, timing of a characteristic associated with a swimming stroke based on an in-phase/quadrature phase amplitude of one or more signals received by a satellite positioning system (SPS) receiver.

10. The method of claim 9, wherein determining the swimming stroke comprises:

determining the swimming stroke further based on a swim stroke indication received by the user input device.

11. The method of claim 9, wherein the swimming indication comprises an indication of a pool length.

12. The method of claim 9, wherein determining the swimming stroke comprises:

determining whether the mobile device is above water.

13. The method of claim 9, wherein determining the swimming stroke comprises:

determining whether the mobile device is within a threshold distance below water.

14. The method of claim 9, further comprising:

determining a pattern of movement of the mobile device, wherein determining the swimming stroke comprises:

determining the swimming stroke further based on the determined pattern of movement of the mobile device.

15. A mobile device comprising:

means for receiving a swimming indication of swimming by a user of the mobile device; and means for determining, in response to the swimming indication, timing of a characteristic associated with a swimming stroke based on an in-phase/quadrature phase amplitude of one or more signals received by a satellite positioning system (SPS) receiver.

* * * * *